(12) United States Patent
Nishimura

(10) Patent No.: US 9,499,063 B2
(45) Date of Patent: Nov. 22, 2016

(54) POWER-SUPPLY DEVICE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventor: Tsuguo Nishimura, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 219 days.

(21) Appl. No.: 14/387,136

(22) PCT Filed: Dec. 28, 2012

(86) PCT No.: PCT/JP2012/084115
§ 371 (c)(1),
(2) Date: Sep. 22, 2014

(87) PCT Pub. No.: WO2013/145495
PCT Pub. Date: Oct. 3, 2013

(65) Prior Publication Data
US 2015/0084580 A1  Mar. 26, 2015

(30) Foreign Application Priority Data
Mar. 29, 2012 (JP) .................................. 2012-077115

(51) Int. Cl.
*H02J 7/04* (2006.01)
*B60L 11/18* (2006.01)
*H02J 7/00* (2006.01)
*B60L 3/00* (2006.01)

(52) U.S. Cl.
CPC .......... *B60L 11/1851* (2013.01); *B60L 3/0084* (2013.01); *B60L 11/1868* (2013.01); *H02J 7/0036* (2013.01); *H02J 7/0052* (2013.01); *H02J 7/0054* (2013.01); *Y02T 10/7005* (2013.01); *Y02T 10/7066* (2013.01)

(58) Field of Classification Search
USPC ........................................................ 320/107
See application file for complete search history.

(56) References Cited

U.S. PATENT DOCUMENTS

2008/0100272 A1* 5/2008 Yoshio ...................... G05F 1/56
                                                       323/266
2010/0085020 A1* 4/2010 Suzuki ...................... B25F 5/00
                                                       320/157

FOREIGN PATENT DOCUMENTS

JP    A-7-107601    4/1995
JP    A-2003-284320 10/2003
JP    A-2008-131819 6/2008

*Primary Examiner* — Robert Grant
(74) *Attorney, Agent, or Firm* — Oliff PLC

(57) ABSTRACT

Disclosed is a power-supply device configured to supply an operating voltage from an external battery to a control circuit via a voltage terminal. The power-supply device is also configured to supply an operating voltage from an output terminal to a driving circuit of the power-supply device via a switch. The control circuit that has received the operating voltage compares the voltage of the output terminal with a predetermined voltage, and makes a determination. If the voltage of the output terminal is not higher than the predetermined voltage, a predetermined notification is sent outside the power-supply device.

6 Claims, 9 Drawing Sheets

POWER-SUPPLY DEVICE

BACKGROUND

The present disclosure relates to a power-supply device that converts a supplied DC voltage by switching with a switching element, and supplies the converted DC voltage from an output terminal to an external battery.

Vehicles such as hybrid vehicles and electric vehicles include a driving motor and a high-voltage battery for supplying power to the driving motor. The output voltage of the high-voltage battery is provided to the driving motor after being boosted by a voltage-boosting converter, and provided to auxiliary devices after being stepped down by a step-down converter.

FIG. 1 is a block diagram showing an example of a configuration of a major part of a conventional power-supply device 5C for use in such a hybrid vehicle or an electric vehicle. The power-supply device 5C includes a DC/AC conversion circuit 51 that converts DC voltage from a high-voltage battery 4, which is connected to the outside via system relays SRB and SRG, to AC voltage, a control circuit 52 that generates a control signal for turning on or off a MOSFET (hereinafter referred to as "FET") 511 provided in the DC/AC conversion circuit 51, and a driving circuit 53 that drives the FET 511 with the use of the control signal.

The AC voltage generated through conversion by the DC/AC conversion circuit 51 is stepped down by an isolation transformer 54 and rectified by a rectifier circuit 55, and the rectified DC voltage is smoothed by a smoothing circuit 56 and then supplied from an output terminal 501 to a low-voltage battery 6, a power supply ECU 7 and an unshown low-voltage load (auxiliary devices) that are provided outside. Low operating voltage is supplied to the control circuit 52 and the driving circuit 53 from a converter circuit 57 that converts the voltage of the high-voltage battery 4. The control circuit 52 detects voltage applied to a voltage terminal 502 in response to an ignition (IG) relay contact 61 being controlled to be on by the power supply ECU 7, and starts generating the aforementioned control signal. The control circuit 52 is also configured to notify the power supply ECU 7 of a power supply failure signal if a failure is detected in the power-supply device 5C.

The aforementioned power-supply device 5C is problematic in that low operating voltage is supplied from the converter circuit 57, which is connected to the high-voltage battery 4, to the control circuit 52 and the driving circuit 53 that need to be electrically isolated from circuitry provided on the high-voltage battery 4 side, and thus complex and expensive circuitry is required.

To address this, Japanese Patent Application 2003-284320A discloses a DC-DC converter for automotive use in which operating voltage for a control circuit and a voltage detection circuit, which respectively correspond to the control circuit 52 and the driving circuit 53 shown in FIG. 1, is supplied from an auxiliary power supply (low-voltage battery) connected to output terminals of the DC-DC converter via a switching means. This configuration eliminates the need to provide a separate power supply such as the aforementioned converter circuit 57. In addition, by controlling the switching means to be off by an external ECU while the DC-DC converter is not performing voltage conversion, unwanted discharge of the low-voltage battery connected to the output terminals of the DC-DC converter is prevented.

SUMMARY

However, with the conventional power-supply device 5C, disconnection of a wire connecting the output terminal 501 to the low-voltage battery 6 cannot be detected by the control circuit 52. Accordingly, a situation may occur in which the low-voltage battery 6 no longer charged by the power-supply device 5C is excessively discharged. On the other hand, JP 2003-284320A is also problematic in that if a wire connecting the DC-DC converter and the auxiliary power supply disclosed therein is disconnected, no operating voltage is supplied to the control circuit, which is configured to detect a failure, from the auxiliary power supply via the switching means, and thus it is not possible to detect a failure in the wire.

The present device, and variations thereof, has been made under the above-described circumstances, and it is an object of the present disclosure to provide a power-supply device that does not require a special converter for converting the operating voltage of a circuit configured to control a switching element for voltage conversion to be on or off, and that can determine a connection state between an output terminal of the power-supply device and an external battery.

A power-supply device according to the present disclosure is a power-supply device for converting a DC voltage and supplying the converted voltage to an external battery, the power-supply device including: a switching element; a control circuit that generates a control signal to turn on or off the switching element; a driving circuit that drives the switching element by using the control signal generated by the control circuit; an output terminal from which the converted voltage is supplied to the external battery; and a voltage terminal to which voltage is applied from the battery, wherein: the driving circuit is configured to receive voltage supplied from the output terminal, the control circuit is configured to receive voltage supplied from the voltage terminal, and the control circuit is configured to detect the voltage of the output terminal and compare the detected voltage with a predetermined voltage.

According to the present disclosure, the power-supply device is configured to supply operating voltage from an external battery connected to an output terminal to a control circuit via a voltage terminal, and also supply operating voltage from the output terminal to a driving circuit. The control circuit that has received supply of the operating voltage compares the voltage of the output terminal after activation with a predetermined voltage.

With this configuration, if the connection between the output terminal and the external battery is disconnected, the voltage of the output terminal is detected as being below the predetermined voltage. If the connection is not disconnected, the voltage of the external battery is detected as the voltage of the output terminal. Accordingly, a determination as to whether or not the external battery is properly connected is determined based on the result of comparison between the voltage of the output terminal at the time of activation of the control circuit and the predetermined voltage.

Also, the operating voltage of the driving circuit that consumes more current than the control circuit is supplied from the output terminal, and thus a current capacity required by the voltage terminal and an external circuit connected to the voltage terminal is reduced.

The power-supply device according to the present disclosure further includes a switch that switches the voltage supplied from the output terminal to the driving circuit between on and off, wherein the control circuit is configured to turn on the switch each time the control circuit is activated.

According to the present disclosure, the control circuit turns on the operating voltage supplied from the output terminal to the control circuit each time the control circuit is activated. When the operating voltage supplied from the voltage terminal to the control circuit is turned off, the operating voltage supplied from the output terminal to the driving circuit is also turned off.

With this configuration, the current consumption of the power-supply device when it is in a non-operational state as seen from the external battery is reduced to substantially zero, and it is therefore possible to prevent the battery from being excessively discharged.

The power-supply device according to the present disclosure further includes: a resistor circuit that supplies voltage from the voltage terminal to the driving circuit; and a capacitor that is charged with the voltage supplied from the resistor circuit, wherein: the control circuit further includes: a first timer that measures an elapsed time period after the activation of the control circuit; and a second timer that measures an elapsed time period after start of generation of the control signal, and the control circuit is configured to generate the control signal when the first timer has measured a first time period, and turn on the switch when the second timer has measured a second time period.

According to the present disclosure, the resistor circuit is provided between the voltage terminal and the driving circuit, and the capacitor is connected between a connection point between the resistor circuit and the driving circuit and a ground potential. When the first time period elapses after activation of the control circuit, the control circuit starts generating the control signal, and when the second time period elapses after start of generation of the control signal, the control circuit turns on the operating voltage supplied from the output terminal to the driving circuit.

With this configuration, the capacitor is charged with the voltage of the voltage terminal via the resistor circuit during the time period after activation of the control circuit until the first time period elapses, and operating voltage is supplied from the capacitor to the driving circuit during the time period after the first time period until the second time period elapses. After that, operating voltage is supplied from the output terminal to the driving circuit. Accordingly, during the time period from activation of the power-supply device until supply of voltage is started at least to the output terminal, voltage is supplied from the external battery to the driving circuit via the voltage terminal and the resistor circuit, and also the magnitude of current supplied to the driving circuit during that time period is limited by the resistor circuit.

The power-supply device according to the present disclosure further includes: a resistor circuit that supplies voltage from the voltage terminal to the driving circuit; and a capacitor that is charged with the voltage supplied from the resistor circuit, wherein: the control circuit includes a timer that measures an elapsed time period after the activation of the control circuit, and the control circuit is configured to (i) generate the control signal when the timer has measured a predetermined time period, (ii) detect the voltage of the output terminal in time series, and (iii) turn on the switch when the detected voltage reaches a level that is higher, by at least a predetermined threshold value, than the voltage of the output terminal detected at the start of generation of the control signal.

According to the present disclosure, the resistor circuit is provided between the voltage terminal and the driving circuit, and the capacitor is connected between a connection point between the resistor circuit and the driving circuit and a ground potential. When a predetermined time period elapses after activation of the control circuit, the control circuit starts generating the control signal. After that, when the voltage of the output terminal detected in time series reaches a level higher than the voltage detected at the start of generation of the control signal by a predetermined threshold value or more, the control circuit turns on the operating voltage supplied from the output terminal to the driving circuit.

With this configuration, the capacitor is charged with the voltage of the voltage terminal via the resistor circuit during the time period after activation of the control circuit until the predetermined time period elapses, after that, operating voltage is supplied from the capacitor to the driving circuit, and after the voltage of the output terminal rises by the predetermined threshold value or more, operating voltage is supplied from the output terminal to the driving circuit. Accordingly, during the time period from activation of the power-supply device until supply of voltage is started at least to the output terminal, operating voltage is supplied from the external battery to the driving circuit via the voltage terminal and the resistor circuit, and also the magnitude of current supplied to the driving circuit during that time period is limited by the resistor circuit.

In the power-supply device according to the present disclosure, the control circuit is configured to provide a predetermined notification to outside based on a result of the comparison between the detected voltage and the predetermined voltage.

According to the present disclosure, if it is determined based on the result of comparison between the voltage of the output terminal and the predetermined voltage that the external battery is not properly connected, a predetermined notification is provided to the outside, and thus a connection failure between the output terminal and the external battery is notified.

According to the present disclosure, the operating voltage of the control circuit is supplied from the external battery, and if the connection between the output terminal and the external battery is disconnected at the time of activation of the control circuit, the voltage of the output terminal is detected as being below the predetermined voltage. If the connection is not disconnected, the voltage of the external battery is detected as the voltage of the output terminal. Accordingly, a determination as to whether or not the external battery is properly connected is made based on the result of comparison between the voltage of the output terminal at the time of activation of the control circuit and the predetermined voltage.

Accordingly, it is unnecessary to provide a special converter for converting the operating voltage of a circuit configured to control a switching element for voltage conversion to be on or off, and it is possible to determine a connection state between an output terminal of the power-supply device and an external battery.

DETAILED DESCRIPTION

Embodiment 1

Figure 1:
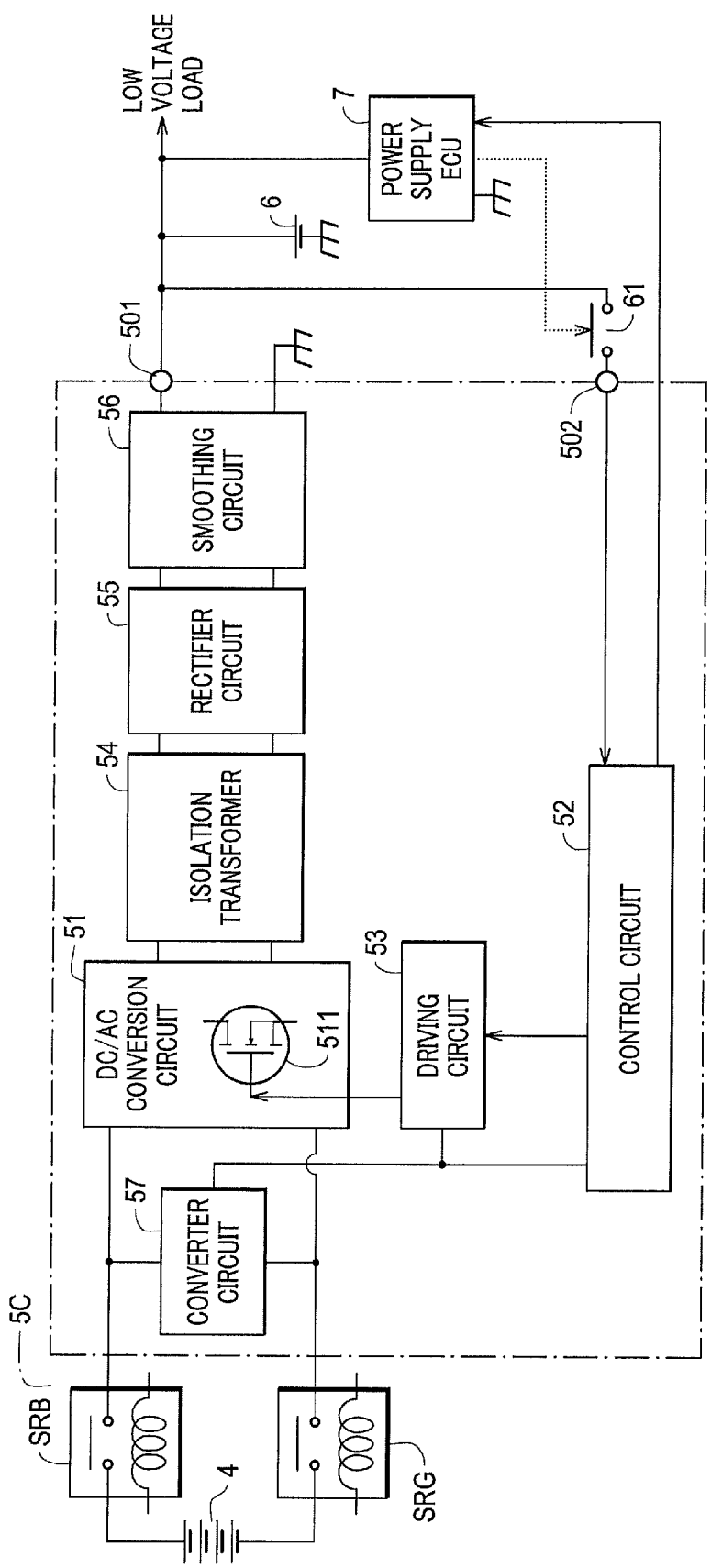
FIG. 1 is a block diagram showing an example of a configuration of a major part of a conventional power-supply device for use in a hybrid vehicle or an electric vehicle.
Figure 2:
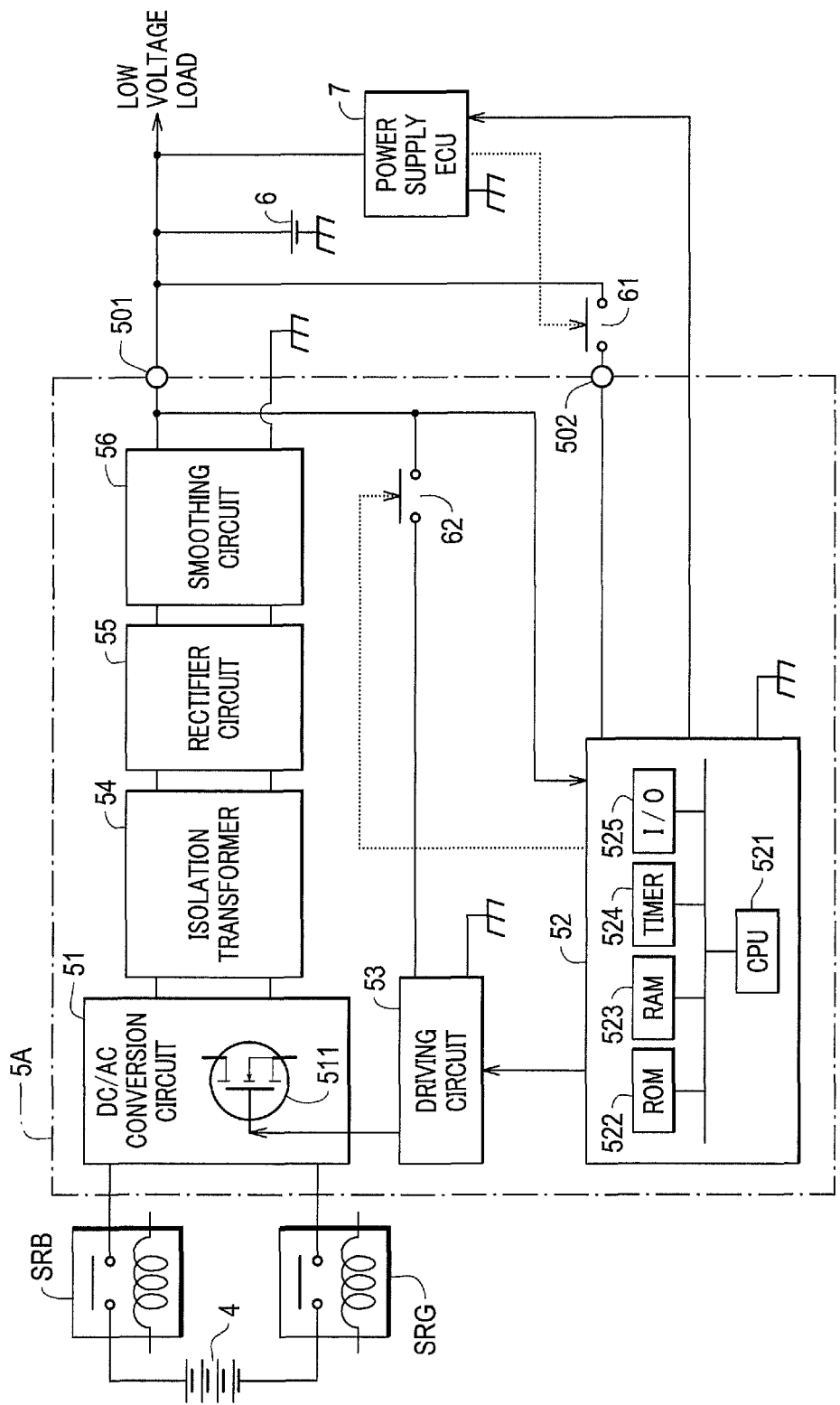
FIG. 2 is a block diagram showing an example of a configuration of a major part of a power-supply device according to Embodiment 1 of the present disclosure.

FIG. 2 is a block diagram showing an example of a configuration of a major part of a power-supply device according to Embodiment 1 of the present disclosure. In the diagram, 5A indicates a power-supply device. The power-supply device 5A includes a DC/AC conversion circuit 51 that converts DC voltage of a high-voltage battery 4, which is connected to the outside via system relays SRB and SRG, to AC voltage, a control circuit 52 that generates a control signal (PWM control signal) for turning on or off a MOSFET (one example of the switching element recited in the claims, hereinafter referred to simply as "FET") 511 provided in the DC/AC conversion circuit 51, and a driving circuit 53 that drives the FET 511 by using the generated PWM control signal. The FET 511 may be constituted by a plurality of FETs such as, for example, a full-bridge (H-bridge) circuit or a half-bridge circuit.

The AC voltage generated through conversion by the DC/AC conversion circuit 51 is stepped down by an isolation transformer 54 and rectified by a rectifier circuit 55. The rectified DC voltage is smoothed by a smoothing circuit 56, and supplied from an output terminal 501 to a low-voltage battery (one example of the battery recited in the claims 6, a power supply ECU 7 and an unshown low-voltage load (auxiliary devices) that are provided outside. The output terminal 501 is connected to the control circuit 52 via an unshown A/D conversion circuit.

The low-voltage battery 6 is connected to a voltage terminal 502 via an IG relay contact 61 that is controlled to be on or off by the power supply ECU 7. When control is performed to turn on the IG relay contact 61, operating voltage (so-called power supply voltage) is supplied from the voltage terminal 502 to the control circuit 52. The output terminal 501 that receives application of voltage from the smoothing circuit 56 and the low-voltage battery 6 is connected to the driving circuit 53 via a voltage relay contact (one example of the switch recited in the claims 62 controlled to be on or off by the control circuit 52. When control is performed to turn on the voltage relay contact 62, operating voltage is supplied from the output terminal 501 to the driving circuit 53.

The voltage relay contact 62 is off while no operating voltage is supplied to the control circuit 52. If dark current of the driving circuit 53 while the aforementioned PWM control signal is not provided to the driving circuit 53 is negligible, then the operating voltage may also be supplied from the output terminal 501 to the driving circuit 53 without the voltage relay contact 62. Also, if a current consumption during the operation of the driving circuit 53 is relatively small, the operating voltage may also be supplied from the voltage terminal 502 to the driving circuit 53.

Note that, in FIG. 2, a fuse for ensuring safety of the devices and the circuits is not illustrated.

The control circuit 52 includes a CPU 521. The CPU 521 is connected via a bus to a ROM 522 in which information such as a program is stored, a RAM 523 in which temporarily generated information is stored, a timer (one example of the first and second timers recited in the claims 524 that measures various time periods, and an I/O port 525 that brings inputs and outputs to and from the components of the power-supply device 5A. The I/O port 525 is used by for example, the CPU 521 performing control to turn on or off the voltage relay contact 62, or detecting the voltage of the output terminal 501 via the aforementioned A/D conversion circuit.

Upon activation of the control circuit 52 by receiving supply of operating voltage from the voltage terminal 502, the CPU 521 starts, at a suitable time, generating the aforementioned PWM control signal by a known generation method with the use of the I/O port 525 or an unshown generation circuit, and provides the generated PWM control signal to the driving circuit 53. The driving circuit 53, which includes an unshown pulse transformer, amplifies the PWM control signal provided from the control circuit 52, and provides the amplified PWM control signal to a gate of the FET 511 via the pulse transformer, so as to drive the FET 511 to an on or off state. The CPU 521 is also configured to, if a failure of connection of the power-supply device 5A is detected, notify the power supply ECU 7 of a power supply connection failure signal.

Hereinafter, the major operations of the control circuit 52 will be described with reference to a flowchart thereof. The processing described below is executed by the CPU 521 in accordance with a control program stored in advance in the ROM 522.

Figure 3:
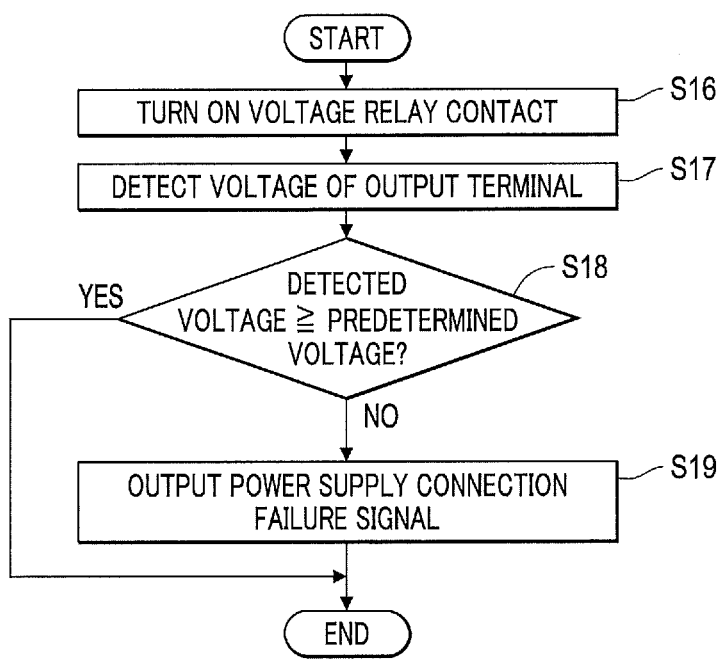
FIG. 3 is a flowchart illustrating a processing procedure for detecting the voltage of an output terminal and comparing the detected voltage with a predetermined voltage, performed by a CPU.

FIG. 3 is a flowchart illustrating a processing procedure for detecting the voltage of the output terminal 501 and comparing the detected voltage with a predetermined voltage, performed by the CPU 521. The processing shown in FIG. 3 is activated when control is performed to turn on the IG relay contact 61, and operating voltage (the voltage of the low-voltage battery 6) is supplied from the voltage terminal 502 to the control circuit 52.

If a failure of connection of the power-supply device is not detected at the time of activation (if, for example, YES is determined in step S18, which will be described later), the CPU 521 starts generating the PWM control signal by a known generation method (not shown in the flowchart).

Each time the processing shown in FIG. 3 is activated, the CPU 521 controls the voltage relay contact 62 to be on via the I/O port 525 (S16), and supplies the operating voltage to the driving circuit 53. After that, the CPU 521 detects the voltage of the output terminal 501 (S17), and determines whether or not the detected voltage is higher than or equal to a predetermined voltage (for example, 6 V, which is one half of 12 V) (S18).

If the detected voltage is higher than or equal to the predetermined voltage (YES in S18), the CPU 521 ends the processing shown in FIG. 3 without performing any operation. If the detected voltage is not higher than or equal to the predetermined voltage (No in S18), it means that the voltage of the low-voltage battery 6 is not applied to the output terminal 501 (in other words, the connection between the output terminal 501 and the low-voltage battery 6 is disconnected), and thus the CPU 521 outputs a power supply connection failure signal to the power supply ECU 7 (S19), and ends the processing shown in FIG. 3.

As described above, according to Embodiment 1, the operating voltage is supplied from the external low-voltage battery connected to the output terminal to the control circuit via the IG relay contact and the voltage terminal, and the operating voltage is supplied from the output terminal to the driving circuit via the voltage relay contact. The control circuit that has received supply of the operating voltage compares the voltage of the output terminal detected after activation with the predetermined voltage and makes a determination.

With this configuration, if the connection between the output terminal and the external battery is disconnected (or not disconnected), the detected voltage of the output terminal is below the predetermined voltage (or higher than or equal to the predetermined voltage), and thus a determination as to whether or not the external battery is properly connected is made based on the determination made as a result of comparison between the voltage of the output terminal at the time of activation of the control circuit and the predetermined voltage.

Accordingly, it is unnecessary to provide a special converter for converting the operating voltage of a circuit configured to control a switching element for voltage conversion to be on or off, and it is possible to determine a connection state between the output terminal of the power-supply device and the external battery. Also, the operating voltage of the driving circuit that consumes more current than the control circuit is supplied from the output terminal, and thus a current capacity required by the voltage terminal and an external circuit connected to the voltage terminal is reduced.

Also, the control circuit controls the voltage relay contact to be on each time the control circuit is activated, thereby turning on the operating voltage supplied from the output terminal to the driving circuit. The voltage relay contact is off while no operating voltage is supplied to the control circuit.

Accordingly, the current consumption, as seen from the external battery, of the power-supply device when it is in a non-operational state is reduced to substantially zero, and it is therefore possible to prevent the battery from being excessively discharged.

Embodiment 2

Embodiment 1 is configured such that the operating voltage is supplied from the output terminal 501 to the driving circuit 53 via the voltage relay contact 62, whereas Embodiment 2 is configured such that the operating voltage is supplied from the voltage terminal 502 to the driving circuit 53 via a resistor circuit before control is performed to turn on the voltage relay contact 62. According to Embodiment 1, the operating voltage continues to be supplied to the driving circuit 53 exclusively from the low-voltage battery 6 during the time period from the start of supply of the operating voltage to the control circuit 52 until the DC voltage converted by the power-supply device is output to the output terminal 501. The magnitude of current that can be supplied from the output terminal 501 to the driving circuit 53 during that time period may be limited depending on the application. Embodiment 2 addresses this limitation.

Figure 4:
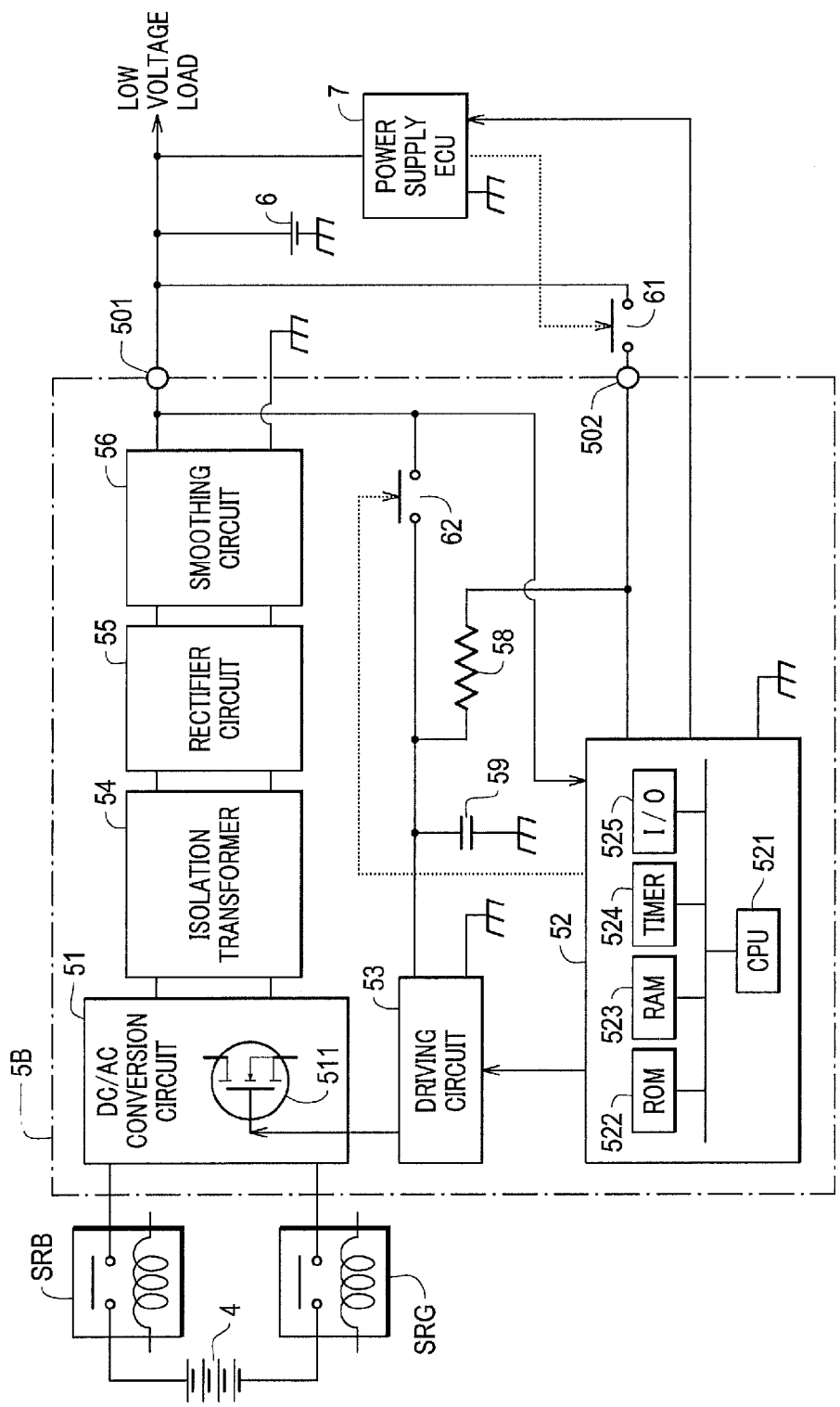
FIG. 4 is a block diagram showing an example of a configuration of a major part of a power-supply device according to Embodiment 2 of the present disclosure.

FIG. 4 is a block diagram showing an example of a configuration of a major part of a power-supply device according to Embodiment 2 of the present disclosure. In the diagram, 5B indicates a power-supply device. The power-supply device 5B includes a DC/AC conversion circuit 51 that converts DC voltage of a high-voltage battery 4, which is connected to the outside via system relays SRB and SRG, to AC voltage, a control circuit 52 that generates a PWM control signal for turning on or off a FET 511 provided in the DC/AC conversion circuit 51, and a driving circuit 53 that drives the FET 511 by using the generated PWM control signal. The power-supply device 5B further includes a resistor (one example of the resistor circuit recited in the claims 58 that supplies voltage from a voltage terminal 502 to the driving circuit 53, and a capacitor 59 that is charged with the voltage supplied from the resistor 58. That is, the resistor 58 is provided between the voltage terminal 502 and the driving circuit 53, and the capacitor 59 is connected between a connection point between the resistor 58 and the driving circuit 53 and a ground potential. Other than this, the connection configuration is the same as that of Embodiment 1 shown in FIG. 2.

Figure 5:
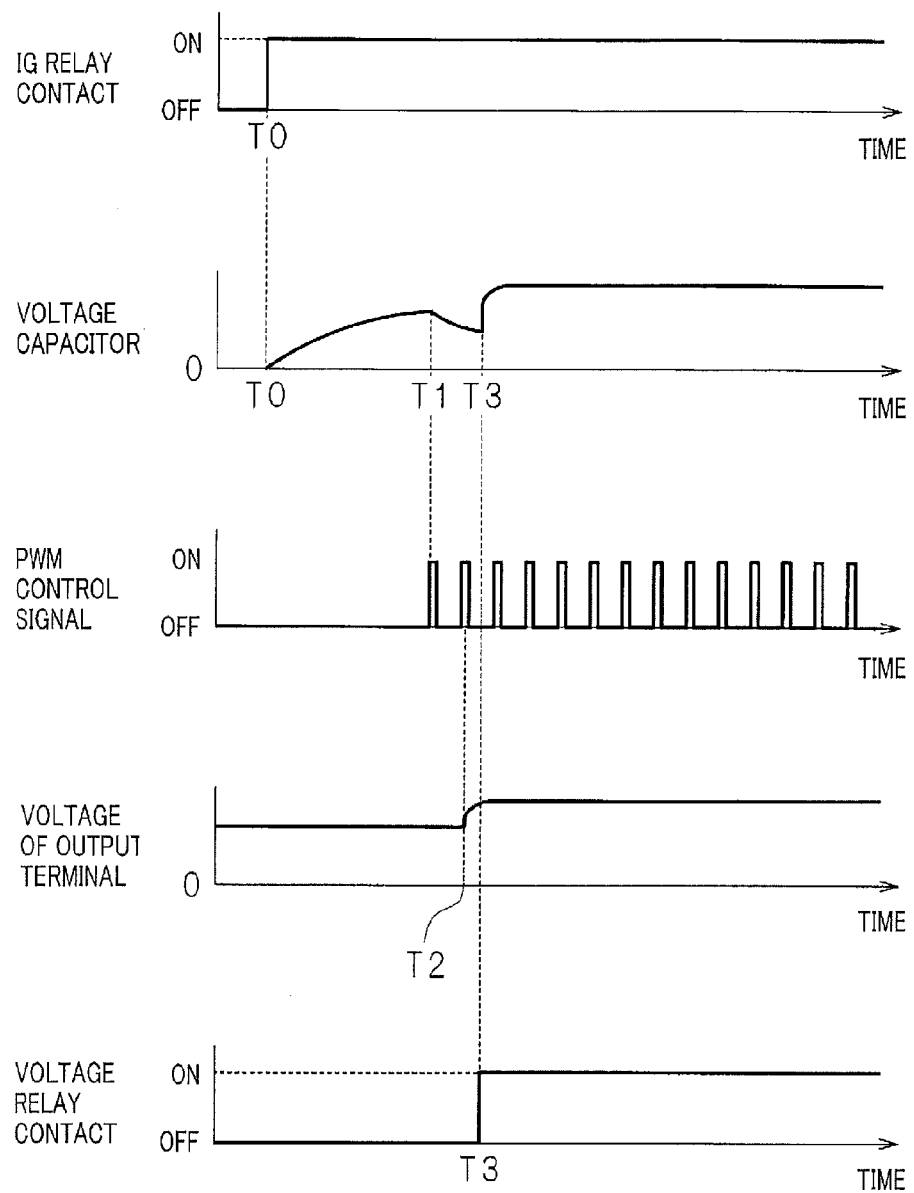
FIG. 5 shows timing charts illustrating the timing of operations of major components of the power-supply device according to Embodiment 2 of the present disclosure after activation of the power-supply device.

The following description focuses on the functions of the resistor 58 and the capacitor 59. FIG. 5 shows timing charts illustrating the timing of operations of major components of the power-supply device 5B according to Embodiment 2 of the present disclosure. The five charts shown in FIG. 5 have the same time axis as the horizontal axis. Along the vertical axis, the on/off state of the IG relay contact 61, the voltage of the capacitor 59, the on/off state of the PWM control signal provided to the driving circuit 53 from the control circuit 52, the voltage of the output terminal 501, and the on/off state of the voltage relay contact 62 are shown from the top of the diagram.

When control is performed to turn on the IG relay contact 61 at a time T0, the control circuit 52 is activated and starts appropriate control operations. Meanwhile, the capacitor 59 is charged with the voltage supplied from the voltage terminal 502 via the resistor 58, and thus the voltage of the capacitor 59 rises as indicated by a charge curve which is convex upward, during which the resistor 58 limits the magnitude of charge current flowing from the voltage terminal 502 to the capacitor 59.

At a time T1, which is the time elapsed by a first time period from the time T0, the voltage of the capacitor 59 substantially reaches the voltage of the low-voltage battery 6, and the control circuit 52 starts generating a PWM control signal at this timing. Then, the driving circuit 53 receiving the operating voltage from the capacitor 59 amplifies the PWM control signal provided from the control circuit 52 and starts driving the FET 511 to an on or off state. As a result, the capacitor 59 is discharged, and the voltage of the capacitor 59 drops as indicated by the charge curve which is convex downward.

After a time T2, which is the time delayed by a small amount of time from the time T1, the DC voltage converted by the power-supply device starts to be output to the output terminal 501, and the low-voltage battery 6 is charged. After that, at a time T3, control is performed to turn on the voltage relay contact 62, and the operating voltage is supplied to the driving circuit 53 from the output terminal 501. Accordingly, after the time T3, the voltage of the capacitor 59 is higher than the voltage at the time T1.

The major operations of the control circuit 52 will be described below with reference to a flowchart thereof. The processing described below is executed by the CPU 521 in accordance with a control program stored in advance in the ROM 522.

Figure 6:
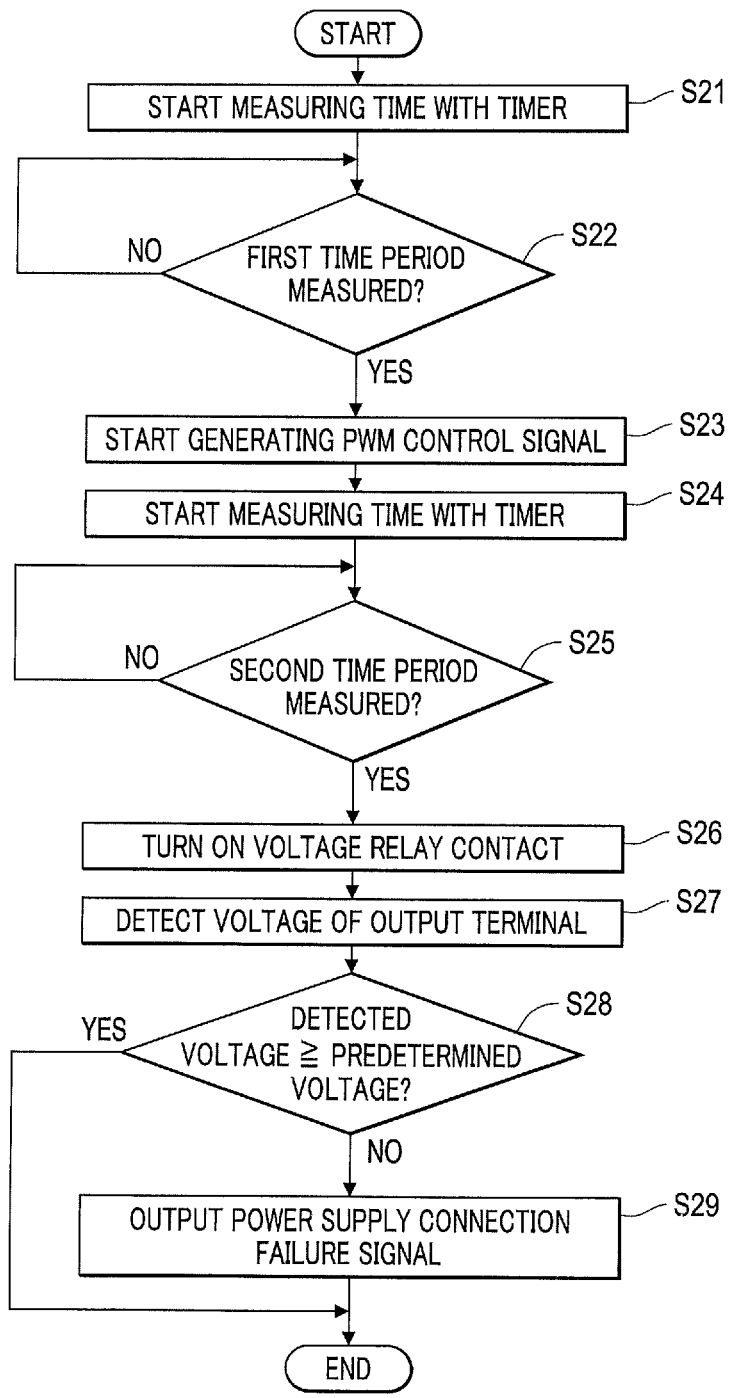
FIG. 6 is a flowchart illustrating a processing procedure for measuring an elapsed time period after activation and performing predetermined control operations, performed by the CPU.

FIG. 6 is a flowchart illustrating a processing procedure for measuring an elapsed time period after activation and performing predetermined control operations, performed by the CPU 521. The processing shown in FIG. 6 is activated when control is performed to turn on the IG relay contact 61, and operating voltage (the voltage of the low-voltage battery 6) is supplied from the voltage terminal 502 to the control circuit 52.

Each time the processing shown in FIG. 6 is activated, the CPU 521 starts measuring time by using a timer 524 (S21). After that, the CPU 521 determines whether or not the timer 524 has measured a first time period (S22), and waits for the first time period to be measured (NO in S22). The first time period as used here is the time period from the time T0 to the time T1 shown in FIG. 5. If the timer 524 has measured the first time period (YES in S22), the CPU 521 starts generating a PWM control signal by using a known generation method (S23), and again starts measuring time by using the timer 524 (S24).

After that, the CPU 521 determines whether or not the timer 524 has measured a second time period (S25), and waits for the second time period to be measured (NO in S25). The second time period as used here is the time period from the time T1 to the time T3 shown in FIG. 5. If the timer 524 has measured the second time period (YES in S25), the CPU 521 performs control to turn on the voltage relay contact 62 (S26). The processing of steps S26 to S29 is the same as the processing of steps S16 to S19 of Embodiment 1 shown in FIG. 3, and thus a description thereof is not given here.

Also, components corresponding to those of Embodiment 1 are given the same reference numerals, and a description thereof is not given here.

As described above, according to Embodiment 2, the resistor is provided between the voltage terminal and the driving circuit, and the capacitor 59 is connected between a connection point between the resistor and the driving circuit and a ground potential. When the first time period elapses after activation of the control circuit, the control circuit starts generating a control signal. When the second time period elapses after the start of generation of the control signal, the control circuit performs control to turn on the voltage relay contact.

With this configuration, the capacitor is charged with the voltage of the voltage terminal (the voltage of the low-voltage battery) via the resistor during the time period after activation of the control circuit until the first time period elapses, and the operating voltage is supplied from the capacitor to the driving circuit during the time period after the first time period until the second time period elapses. After that, the operating voltage is supplied from the output terminal to the driving circuit.

Accordingly, during the time period from activation of the power-supply device until supply of voltage is started at least to the output terminal, it is possible to supply voltage from the external low-voltage battery to the driving circuit via the voltage terminal and the resistor, and also to limit the magnitude of current supplied to the driving circuit during that time period with the use of the resistor.

In Embodiments 1 and 2, the CPU 521 is configured to detect the voltage of the output terminal 501, compare the detected voltage with a predetermined voltage, and output a power supply connection failure signal depending on the result of comparison, but the configuration is not limited thereto. It is possible to use, for example, a configuration in which a comparator circuit implemented by hardware and configured to compare the voltage of the output terminal 501 with a predetermined voltage is provided, and a power supply connection failure signal is output depending on the result of comparison at the timing at which these voltages are to be compared.

Embodiment 3

Embodiment 2 is configured such that the control circuit 52 performs control to turn on the voltage relay contact 62 when the second time period elapses after start of generation of a control signal, whereas Embodiment 3 is configured such that the control circuit 52 performs control to turn on the voltage relay contact 62 when the voltage of the output terminal 501 rises by a predetermined threshold value or more after start of generation of a control signal.

Figure 7:
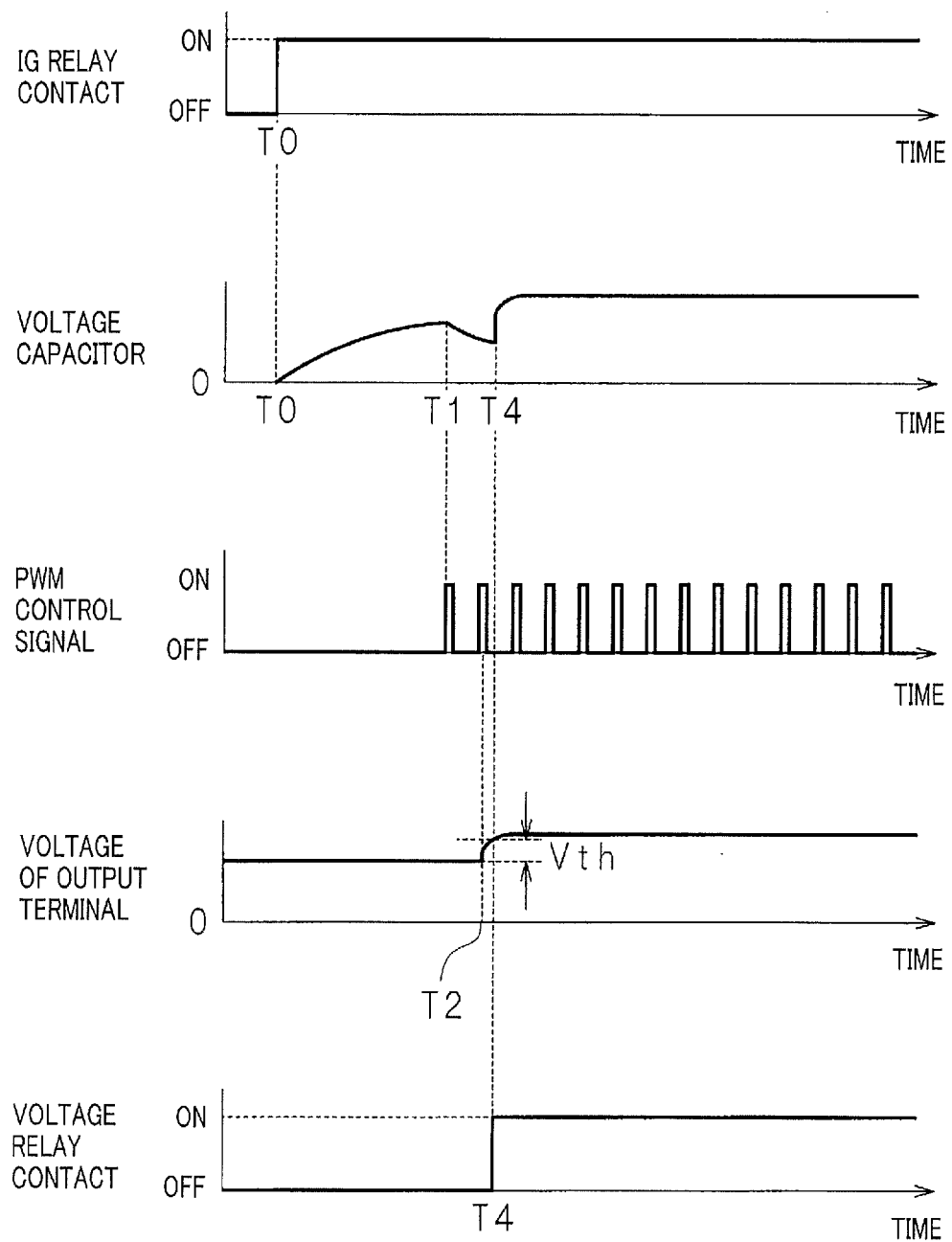
FIG. 7 shows timing charts illustrating the timing of operations of major components of the power-supply device according to Embodiment 3 of the present disclosure after activation of the power-supply device.

FIG. 7 shows timing charts illustrating the timing of operations of major components of the power-supply device 5B after activation of the power-supply device according to Embodiment 3 of the present disclosure. The five charts shown in FIG. 7 have the same time axis as the horizontal axis. As in the case of FIG. 5, the on/off state of the IG relay contact 61, the voltage of the capacitor 59, the on/off state of the PWM control signal provided to the driving circuit 53 from the control circuit 52, the voltage of the output terminal 501, and the on/off state of the voltage relay contact 62 are shown along the vertical axis from the top of the diagram.

The operations of performing control to turn on the IG relay contact 61 at a time T0, starting generating a PWM control signal performed by the control circuit 52 at a time T1, and outputting the DC voltage converted by the power-supply device to the output terminal 501 at a time T2 are the same as those of Embodiment 2 shown in FIG. 5. After the time T2, charging of the low-voltage battery 6 is started, and the voltage of the output terminal 501 starts rising toward the maximum charge voltage.

After that, when the voltage of the output terminal 501 reaches a level higher than the voltage obtained at the time T2 by a predetermined threshold value (Vth) at a time T4, control is performed to turn on the voltage relay contact 62, and the operating voltage is supplied to the driving circuit 53 from the output terminal 501. The magnitude of the predetermined threshold value may be changed as appropriate according to the charged state of the low-voltage battery 6 (for example, the battery voltage before charging or the remaining capacity).

Hereinafter, the major operations of the control circuit 52 will be described with reference to a flowchart thereof. The processing described below is executed by the CPU 521 in accordance with a control program stored in advance in the ROM 522.

Figure 8:
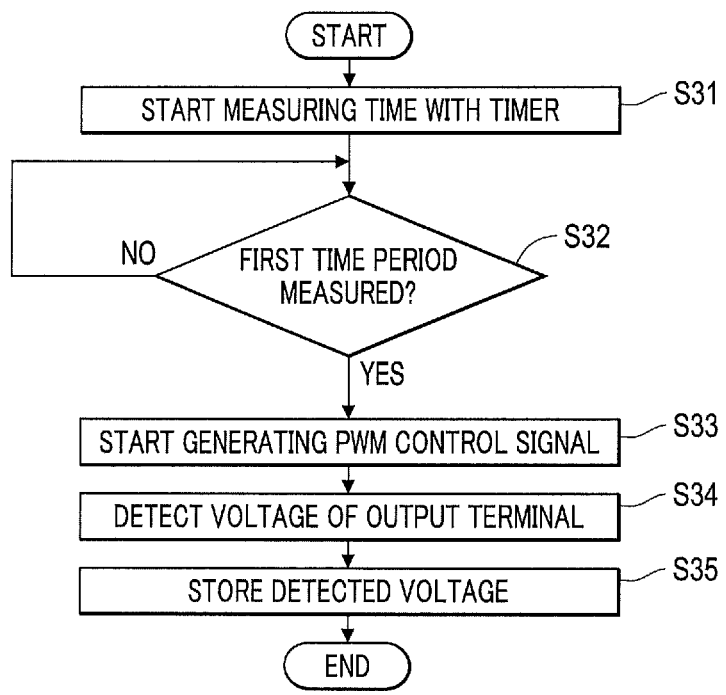
FIG. 8 is a flowchart illustrating a processing procedure for storing the voltage of the output terminal at the start of generating a PWM control signal, performed by the CPU.
Figure 9:
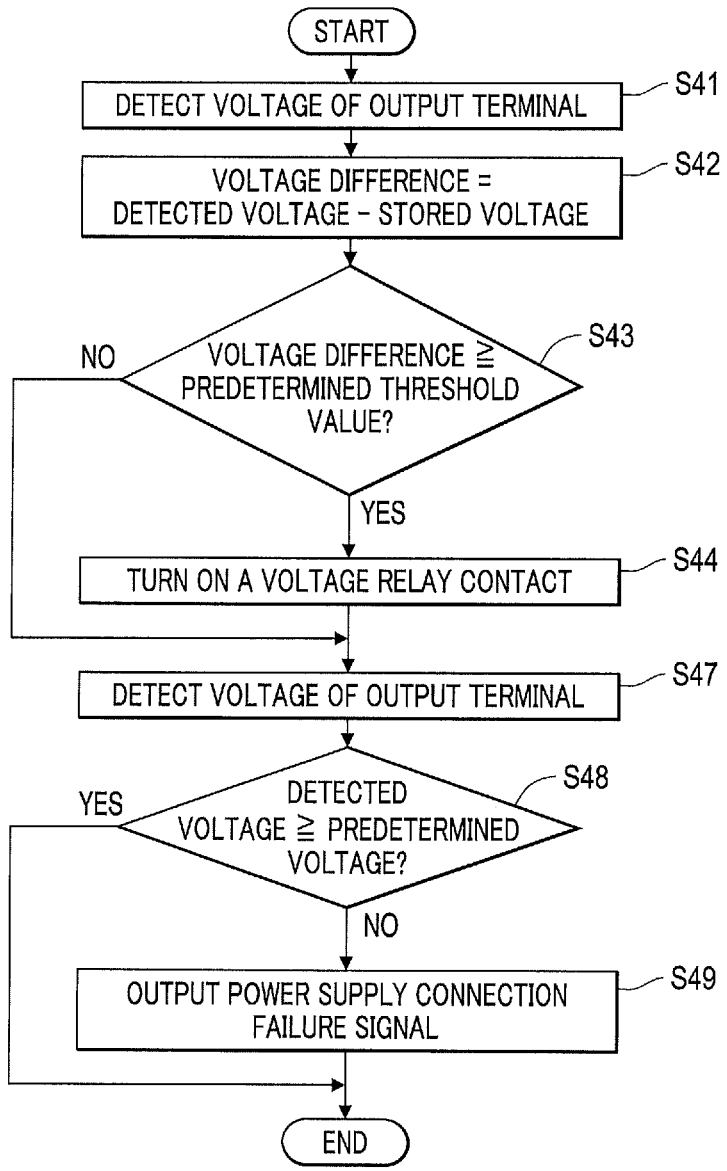
FIG. 9 is a flowchart illustrating a processing procedure for comparing the voltage of the output terminal detected in time series with the stored voltage, performed by the CPU.

FIG. 8 is a flowchart illustrating a processing procedure for storing the voltage of the output terminal 501 at the start of generating a PWM control signal, performed by the CPU 521. FIG. 9 is a flowchart illustrating a processing procedure for comparing the voltage of the output terminal detected in time series with the stored voltage, performed by the CPU 521.

The processing shown in FIG. 8 is activated when control is performed to turn on the IG relay contact 61, and operating voltage (the voltage of the low-voltage battery 6) is supplied from the voltage terminal 502 to the control circuit 52. The processing shown in FIG. 9 is activated, for example, every 250 milliseconds, but the configuration is not limited thereto.

Upon activation of the processing shown in FIG. 8, the CPU 521 starts measuring time by using the timer 524 (S31). The processing of steps S31 to S33 is the same as the processing of steps S21 to S23 of Embodiment 2 shown in FIG. 6, and thus a description thereof is not given here.

After generation of a PWM control signal is started in step S33, the CPU 521 detects the voltage of the output terminal 501 (S34), stores the detected voltage in the RAM 523 (S35), and ends the processing shown in FIG. 8.

Next, upon activation of the processing shown in FIG. 9, the CPU 521 detects the voltage of the output terminal 501 (S41), and calculates a voltage difference obtained by subtracting the voltage stored in the RAM 523 from the detected voltage of the output terminal 501 (S42). After that, the CPU 521 determines whether or not the calculated voltage difference is greater than or equal to a predetermined threshold value (Vth) (S43). If the voltage difference is less than or equal to the predetermined threshold value (YES in S43), control is performed to turn on the voltage relay contact 62 (S44).

If the voltage difference is not less than or equal to the predetermined threshold value (NO in S43), or the processing of step S44 has finished, the CPU 521 detects the voltage of the output terminal 501 (S47). The processing of steps S47 to S49 is the same as the processing of steps S27 to S29 of Embodiment 2 shown in FIG. 6, and thus a description thereof is not given here.

Also, components corresponding to those of Embodiments 1 and 2 are given the same reference numerals, and a description thereof is not given here.

As described above, according to Embodiment 3, in the same connection configuration as in Embodiment 2, when the first time period elapses after activation of the control circuit, the control circuit starts generating a control signal, and after that, if the voltage of the output terminal detected every 250 milliseconds reaches a level higher than the voltage detected at the start of generation of the control signal by a predetermined threshold value (Vth) or more, the control circuit performs control to turn on the voltage relay contact.

With this configuration, the capacitor is charged with the voltage of the voltage terminal (the voltage of the low-voltage battery) via the resistor during the time period after activation of the control circuit until the first time period elapses, after that, the operating voltage is supplied from the capacitor to the driving circuit, and when the voltage of the output terminal rises by a predetermined threshold value (Vth) or more, the operating voltage is supplied from the output terminal to the driving circuit.

Accordingly, during the time period from activation of the power-supply device until supply of voltage is started at least to the output terminal, it is possible to supply voltage from the external low-voltage battery to the driving circuit via the voltage terminal and the resistor, and also to limit the magnitude of current supplied to the driving circuit during that time period with the use of the resistor.

Also, according to Embodiments 1 to 3, if it is determined based on the result of comparison between the voltage of the output terminal and the predetermined voltage that the external low-voltage battery is not properly connected to the output terminal, a power supply connection failure signal is notified to the external power supply ECU, and thus a connection failure between the output terminal and the external battery can be informed to the outside.

In Embodiments 2 and 3, generation of a PWM control signal is started when the first time period elapses after activation of the control circuit 52, but the configuration is not limited thereto, and it is possible to use a configuration in which, for example, the voltage of the capacitor 59 is detected in time series, and when the detected voltage reaches a level higher than or equal to a predetermined voltage, generation of the PWM control signal is started.

The embodiments disclosed in this application are to be considered in all respects as illustrative and not limiting. The scope of the present invention is indicated by the appended claims rather than by the foregoing description, and all changes which come within the meaning and range of equivalency of the claims are intended to be embraced therein.

The invention claimed is:

1. A power-supply device for converting a DC voltage and supplying the converted voltage to an external battery, the power-supply device comprising:
   a switching element;
   a control circuit that generates a control signal to turn on or off the switching element;
   a driving circuit that drives the switching element by using the control signal generated by the control circuit;
   an output terminal from which the converted voltage is supplied to the external battery; and
   a voltage terminal to which voltage is applied from the battery, wherein:
   the driving circuit is configured to receive voltage supplied from the output terminal,
   the control circuit is configured to receive voltage supplied from the voltage terminal,
   the control circuit is configured to detect the voltage of the output terminal and compare the detected voltage with a predetermined voltage,
   the power-supply device further comprises:
   a switch that switches the voltage supplied from the output terminal to the driving circuit between on and off,
   a resistor circuit that supplies voltage from the voltage terminal to the driving circuit, and
   a capacitor that is charged with the voltage supplied from the resistor circuit,
   the control circuit is configured to turn on the switch each time the control circuit is activated,
   the control circuit includes a timer that measures an elapsed time period after the activation of the control circuit, and
   the control circuit is configured to (i) generate the control signal when the timer has measured a predetermined time period, (ii) detect the voltage of the output terminal in time series, and (iii) turn on the switch when the detected voltage reaches a level that is higher, by at least a predetermined threshold value, than the voltage of the output terminal detected at the start of generation of the control signal.

2. The power-supply device according to claim 1, wherein:
   the timer that measures an elapsed time period after the activation of the control circuit is a first timer,
   the power-supply device further comprises a second timer that measures an elapsed time period after start of generation of the control signal, and
   the control circuit is configured to generate the control signal when the first timer has measured a first time period, and turn on the switch when the second timer has measured a second time period.

3. The power-supply device according to claim 1, wherein the control circuit is configured to provide a predetermined notification to outside based on a result of the comparison between the detected voltage and the predetermined voltage.

4. The power-supply device according to claim 2, wherein the control circuit is configured to provide a predetermined notification to outside based on a result of the comparison between the detected voltage and the predetermined voltage.

5. The power-supply device according to claim 3, wherein:
the control circuit provides the predetermined notification if the detected voltage is less than the predetermined voltage, and
the control circuit does not provide the predetermined notification if the detected voltage is greater than or equal to the predetermined voltage.

6. The power-supply device according to claim 4, wherein:
the control circuit provides the predetermined notification if the detected voltage is less than the predetermined voltage, and
the control circuit does not provide the predetermined notification if the detected voltage is greater than or equal to the predetermined voltage.

* * * * *